(12) United States Patent
Kim et al.

(10) Patent No.: US 10,362,643 B2
(45) Date of Patent: Jul. 23, 2019

(54) LED DRIVER CIRCUIT AND LED DRIVING METHOD

(71) Applicant: FAIRCHILD KOREA SEMICONDUCTOR LTD., Bucheon (KR)

(72) Inventors: Young-Jong Kim, Seoul (KR); Hyun-Chul Eum, Seoul (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 15 days.

(21) Appl. No.: 15/626,307

(22) Filed: Jun. 19, 2017

(65) Prior Publication Data

US 2018/0014369 A1  Jan. 11, 2018

Related U.S. Application Data

(60) Provisional application No. 62/366,688, filed on Jul. 26, 2016, provisional application No. 62/359,324, filed on Jul. 7, 2016.

(51) Int. Cl.
  *H05B 33/08* (2006.01)
(52) U.S. Cl.
  CPC ....... *H05B 33/0812* (2013.01); *H05B 33/083* (2013.01); *H05B 33/089* (2013.01); *H05B 33/0845* (2013.01)
(58) Field of Classification Search
  CPC ............ H05B 33/0815; H05B 33/0818; H05B 33/0884; H05B 33/0809; H05B 33/0848; H05B 33/0896; H05B 37/0245; H05B 37/0254; H05B 41/3925; H05B 41/391; H05B 41/2828; H05B 33/0803; H05B 37/0272; H05B 33/0857; H05B 33/0887
  USPC ....... 315/158, 187, 291, 294, 307, 122, 192, 315/224
  See application file for complete search history.

(56) References Cited

U.S. PATENT DOCUMENTS

| | | | | |
|---|---|---|---|---|
| 2010/0134018 A1* | 6/2010 | Tziony | ............... | H05B 33/0815 315/122 |
| 2011/0133655 A1* | 6/2011 | Recker | ...................... | H02J 9/02 315/159 |
| 2012/0056551 A1* | 3/2012 | Zhu | ...................... | H02M 1/4258 315/232 |
| 2012/0080944 A1* | 4/2012 | Recker | ...................... | H02J 9/02 307/25 |
| 2012/0081009 A1* | 4/2012 | Shteynberg | .......... | H05B 33/083 315/122 |

(Continued)

*Primary Examiner* — Douglas W Owens
*Assistant Examiner* — Syed M Kaiser
(74) *Attorney, Agent, or Firm* — Dickinson Wright PLLC

(57) ABSTRACT

A light emitting diode (LED) driver circuit includes an LED string and a conducting state detection circuit. The conducting state detection circuit detects a conducting state of the LED string, and generates a discharge control signal upon sensing that the LED string is in a non-conducting state. A current source generates a discharge current according to the discharge control signal when the LED string is in the non-conducting state. A passive bleeder provides current compensation by internal regulator operation. An LED spike current suppression circuit suppresses spike current that can occur when the input voltage increases above a threshold. A bias supply circuit has an input capacitor that provides a bias voltage.

16 Claims, 14 Drawing Sheets

(56) References Cited

U.S. PATENT DOCUMENTS

| | | | | |
|---|---|---|---|---|
| 2012/0299500 | A1* | 11/2012 | Sadwick | H05B 33/0815 315/224 |
| 2014/0300274 | A1* | 10/2014 | Acatrinei | H05B 33/0815 315/85 |
| 2015/0022105 | A1* | 1/2015 | Walker | H02M 1/36 315/200 R |
| 2015/0208469 | A1* | 7/2015 | Coetzee | H02M 1/36 315/307 |
| 2015/0237693 | A1* | 8/2015 | Knoedgen | H05B 33/0815 315/224 |
| 2015/0366018 | A1* | 12/2015 | Kuang | H05B 33/0848 315/206 |
| 2017/0093210 | A1* | 3/2017 | Recker | H02J 9/065 |
| 2017/0156184 | A1* | 6/2017 | Knoedgen | H02M 7/217 |
| 2017/0290117 | A1* | 10/2017 | Linnartz | H05B 33/0815 |

* cited by examiner

LED DRIVER CIRCUIT AND LED DRIVING METHOD

CROSS-REFERENCE TO RELATED APPLICATIONS

This application claims the benefit of U.S. Provisional Application No. 62/366,688, filed on Jul. 26, 2016 and the benefit of U.S. Provisional Application No. 62/359,324, filed on Jul. 7, 2016, which are both incorporated herein by reference in their entirety.

BACKGROUND OF THE INVENTION

1. Field of the Invention

The present invention relates generally to electrical circuits, and more particularly but not exclusively to electrical circuits for light emitting diodes.

2. Description of the Background Art

A light emitting diode (LED) string may be configured with a plurality of serially-connected LED elements, and may be directly connected to and driven by an input alternating current (AC) source ("AC input"), such as from a wall AC outlet. In that configuration, which is known as Direct AC Drive topology, the AC input may be passed through a dimmer, then rectified by a rectifier circuit, and then supplied as an AC line to the LED elements. The waveform of the AC input that has passed through the dimmer and the rectifier circuit is referred to herein as the "input voltage." The number of LED elements to be conducted, i.e., turned on, in the LED string can be controlled according to the input voltage.

The AC input provides input current that flows through the dimmer and the rectifier circuit. The input current should not be lower than a holding current in order to keep the dimmer turned on. When the input current decreases below the holding current, the dimmer turns off, thereby causing the AC input to be separated from the AC line. Accordingly, when the dimmer is turned off, the input voltage fluctuates, resulting in flicker and difficulty of predicting the input voltage.

When the input current is lower than a certain level, a bleeding operation is initiated in order to regulate the input current. During the bleeding operation, a bleeding circuit causes current to flow from the AC line through a metal oxide semiconductor field effect transistor (MOSFET) of the bleeding circuit. The bleeding operation increases power consumption and generates heat that causes the temperature of the MOSFET to rise.

SUMMARY

In one embodiment, a light emitting diode (LED) driver circuit includes an LED string and a conducting state detection circuit. The conducting state detection circuit detects a conducting state of the LED string, and generates a discharge control signal upon sensing that the LED string is in a non-conducting state. A current source generates a discharge current according to the discharge control signal when the LED string is in the non-conducting state. The LED driver circuit may include a passive bleeder to provide current compensation by internal regulator operation. The LED driver circuit may include an LED spike current suppression circuit to suppress LED spike current that can occur when the input voltage increases above a threshold. The LED driver circuit may include a bias supply circuit that has an input capacitor to provide a bias voltage.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
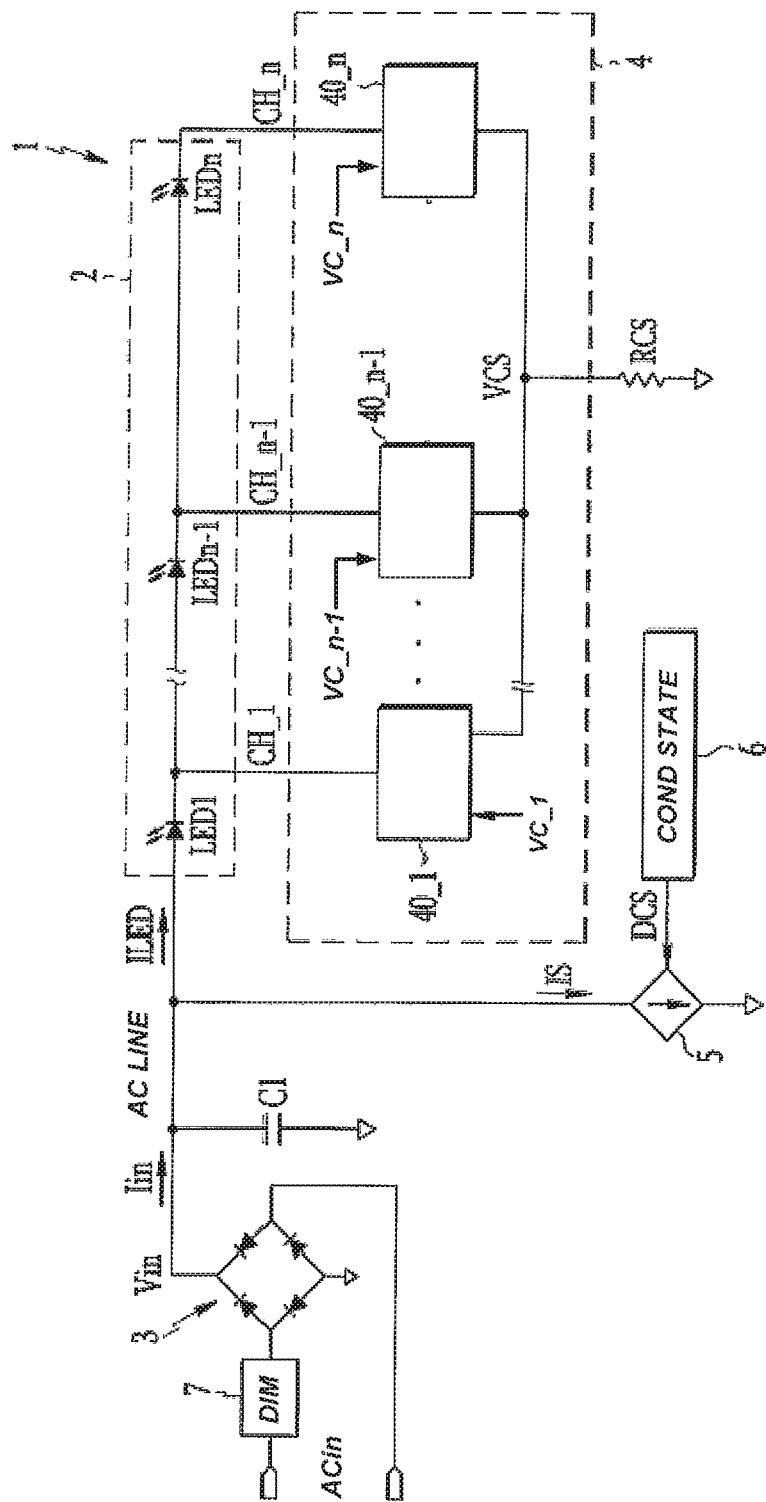
FIG. 1 shows a schematic diagram of an LED driver circuit in accordance with an embodiment of the present invention.

FIG. 1 shows a schematic diagram of an LED driver circuit 1 in accordance with an embodiment of the present invention. In the example of FIG. 1, the LED driver circuit 1 includes a rectifier circuit 3, an LED string 2, an LED current controller 4, a current source 5, a conducting state detection circuit 6, a dimmer 7, and a capacitor C1.

The capacitor C1 is connected to an AC line to which the input voltage Vin is supplied via the rectifier circuit 3. The capacitor C1 filters the ripples of the input voltage Vin.

The dimmer 7 is connected between the AC input ACin and the rectifier circuit 3. The dimmer 7 may be a phase-cut dimmer that passes only the AC input ACin belonging to a certain range of phases, which is referred to herein as "phase angle". The AC input ACin passed through the dimmer 7 is rectified by the rectifier circuit 3 to generate the input voltage Vin. The waveform of the input voltage Vin may have only a portion corresponding to the phase angle.

The LED string 2 includes a plurality of LED elements LED1-LEDn that are connected in series with one another. The input voltage Vin is provided to the LED string 2. While FIG. 1 illustrates a plurality of LED elements, the LED string 2 may be configured with only one LED element.

The controller 4 controls current flowing through a plurality of channels CH_1-CH_n. Each of the plurality of channels CH_1-CH_n is positioned between a corresponding LED element of the plurality of LED elements LED1-LEDn and a corresponding regulator of a plurality of regulators 40_1-40_n. In one embodiment, each of the plurality of regulators 40_1-40_n comprises a linear regulator.

In the example of FIG. 1, one sense resistor RCS is connected to the controller 4, and current flowing through each of the plurality of channels CH_1-CH_n is controlled according to one sense voltage VCS that is developed on the sense resistor. Current may flow through one of the plurality of channels CH_1-CH_n. Accordingly, the current ILED flowing to the LED string 2 may flow through any one of the plurality of channels CH_1-CH_n to the sense resistor RCS to develop the sense voltage VCS.

The controller 4 includes the plurality of regulators 40_1-40_n connected to the plurality of channels CH_1-CH_n, respectively. One of the plurality of regulators 40_1-40_n may be enabled according to the input voltage Vin and control current flowing through a corresponding channel. In one embodiment, each of the plurality of regulators 40_1-40_n may control different amounts of currents.

Each of the plurality of regulators 40_1-40_n is connected to a corresponding channel of the plurality of channels CH_1-CH_n, receives a corresponding control voltage of the plurality of control voltages VC_1-VC_n, and controls the sense voltage VCS with the control voltage to thereby control the current of the corresponding channel. Each of the plurality of control voltages VC_1-VC_n is the voltage that determines the current flowing through a corresponding channel and may be set according to the corresponding channel. In one embodiment, the control voltages VC_1-VC_n have different values with VC_n being the highest and VC_1 being the lowest. For example, each control voltage VC may be a fixed voltage with a relationship VC_1<VC_2<...<VC_n. That is, the control voltage VC_1 corresponding to the regulator 40_1 is lower than the control voltage VC_2 corresponding to the regulator 40_2, the control voltage VC_2 corresponding to the regulator 40_2 is lower than the control voltage VC_3 corresponding to the regulator 40_3, etc.

For convenience of explanation, it is assumed hereinbelow that when the control voltage level corresponding to the LED element LED1 is 1, the control voltage level that corresponds to the LED element LEDn is n.

In the example of FIG. 1, the number of LED elements that will conduct is determined according to the input voltage Vin and, among the channels connected to the conducting LED elements, a regulator of a channel in the highest position is enabled. The current of the corresponding channel is controlled by the enabled regulator based on the corresponding control voltage. Referring to the LED string illustrated in FIG. 1, the channel is in the higher position as the position of the LED element is closer to the right-hand side.

An example operation of the controller 4 when the input voltage Vin increases is now explained. As the input voltage Vin increases, the first LED element LED1 conducts so that current flows through the channel CH_1. The regulator 40_1 controls the current ILED so that the level of the sense voltage VCS follows the level "1".

According to the increasing input voltage Vin, the second LED element LED2 conducts so that the current ILED flows through the channel CH_2. The regulator 40_2 controls the current ILED so that the level of the sense voltage VCS follows the level "2". At this time, the level of the sense voltage VCS is higher than "1", and the regulator 40_1 is disabled.

When the input voltage Vin increases to a certain level, the (n)th LED element LEDn conducts so that the current ILED flows through the channel CH_n. The regulator 40_n controls the current ILED so that the level of the sense voltage VCS follows the level "n". At this time, the level of the sense voltage VCS is higher than "n−1", and the regulator 40_n−1 is disabled.

Next, an example operation of the controller 4 as the input voltage Vin decreases is explained. According to the decreasing input voltage Vin, the (n)th LED element LEDn is turned off so that current does not flow through the channel CH_n and the regulator 40_n is disabled. Accordingly, the regulator 40_n−1 is enabled and the current ILED flows through the channel CH_n−1.

According to the decreasing input voltage Vin, the LED elements are turned off in the order of the (n−1)th LED element, the (n−2)th LED element, (...), the second LED element LED2, and the first LED element LED1 and, accordingly, the regulators are enabled in the order of the regulator 40_n−2, the regulator 40_n−3, (...), the regulator 40_2, and the regulator 40_1. The current ILED flows through the corresponding channels in the order of the channel CH_n−2, the channel CH_n−3, (...), the channel CH_2, and the channel CH_1.

In the example of FIG. 1, the plurality of regulators 40_1-40_n of the controller 4 share the sense resistor RCS, and the plurality of control voltages VC_1-VC_n are set differently such that the regulators to be enabled among the plurality of regulators 40_1-40_n are changed in accordance with a change in the input voltage Vin, and the target value of the corresponding channel current is also changed.

The operation of the controller 4 has been described above by way of example; the present disclosure is not limited thereto.

The input voltage Vin decreases when the dimmer 7 turns off according to a decrease in the input current Iin. Due to the decrease in the input voltage Vin, the plurality of LED elements LED1-LEDn transition to a non-conducting state. Hereinafter, the "LED non-conducting state" refers to a state in which all of the plurality of LED elements LED1-LEDn are not conducting so that the current ILED does not flow to the LED string 2. In the LED non-conducting state, current does not flow through any of the plurality of channels CH_1-CH_n.

In response to sensing the LED non-conducting state, the LED driver circuit 1 controls the input voltage Vin by discharging the capacitor C1. The LED driver circuit 1 may sense the LED non-conducting state from the sense voltage VCS, from a voltage at an end of one of the plurality of LED elements LED1-LEDn, or from an output of a regulator amplifier of the controller 4.

The LED conducting state detection circuit 6 receives the sense voltage VCS or a voltage at an end of one of the plurality of LED elements LED1-LEDn, and when the sense voltage VCS or the voltage at an end of one of the plurality of LED elements LED1-LEDn decreases below a discharge threshold voltage, controls the discharge current IS flowing to the current source 5. The LED conducting state detection circuit 6 may also control the discharge current IS flowing to the current source 5 when the LED non-conducting state is detected from an output of a regulator amplifier of the controller 4.

Because the current ILED does not flow in the LED non-conducting state, the sense voltage VCS is not generated and may be lower than the discharge threshold voltage. Also, the input voltage Vin may be decreased in the LED non-conducting state such that the voltage at an end of one of the plurality of LED elements LED1-LEDn may be lower than the discharge threshold voltage.

Upon sensing the LED non-conducting state, the LED conducting state detection circuit 6 may generate a discharge control signal DCS to control the current flowing through the current source 5.

The current source 5 generates the discharge current IS according to the discharge control signal DCS, and the capacitor C1 is discharged in accordance with the discharge current IS. It is thus possible to control the input voltage Vin in the LED non-conducting state, without the power consumption associated with regulating the input current Iin to the holding current.

Figure 2:
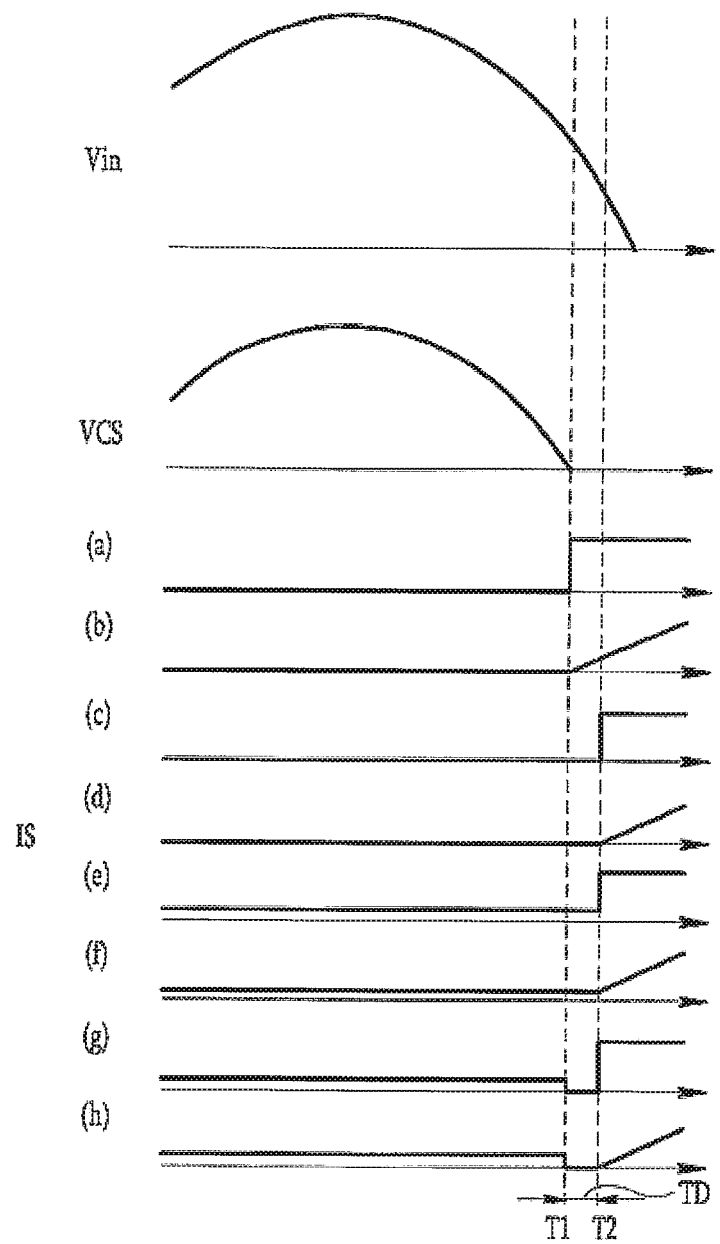
FIG. 2 shows waveforms of signals of the LED driver circuit of FIG. 1 in accordance with an embodiment of the present invention.

FIG. 2 shows waveforms of signals of the LED driver circuit of FIG. 1 in accordance with an embodiment of the present invention. FIG. 2 shows, from top to bottom, the input voltage Vin, the sense voltage VCS, and possible waveforms of the discharge current IS.

In the example of FIG. 2, the LED non-conducting state is sensed using the sense voltage VCS for illustration purposes only. For example, an anode voltage or a cathode voltage of the LED element LED1 may be used to sense the LED non-conducting state in other embodiments. In the example of FIG. 2, the waveforms (a)-(h) illustrate different ways of generating the discharge current IS by way of example.

As illustrated in FIG. 2, according to the decrease in the input voltage Vin, the LED non-conducting state occurs at time point T1, and the sense voltage VCS reaches zero voltage that is lower than the discharge threshold voltage at the time point T1.

As shown in (a) and (b) of FIG. 2, the LED conducting state detection circuit 6 may be synchronized at time point T1 to generate a discharge control signal DCS to increase the discharge current IS. Alternatively, as shown in (c) and (d) of FIG. 2, the LED conducting state detection circuit 6 may be synchronized to generate the discharge control signal DCS to increase the discharge current IS at time point T2, which is delayed from time point T1 by a delay period TD.

As shown in (e), (f), (g) and (h) of FIG. 2, the discharge current IS may flow with a certain offset level before time point T1. This is only to illustrate that the offset level discharge current IS can flow for a duration other than in the LED non-conducting state.

As shown in (e) and (f) of FIG. 2, the LED conducting state detection circuit 6 may be synchronized at time point T2 to generate a discharge control signal DCS to increase the discharge current IS.

As shown in (g) and (h) of FIG. 2, the LED conducting state detection circuit 6 may block the discharge current IS at time point T1, and be synchronized at time point T2 to generate a discharge control signal DCS to increase the discharge current IS.

The current source 5 may generate the discharge current IS into a variety of waveforms like those illustrated in FIG. 2 (a)-(h) according to the discharge control signal DCS. In the LED non-conducting state, the input voltage Vin is decreased by the discharge current IS. In the LED non-conducting state, the waveform of the decreasing input voltage Vin may be controlled according to the waveform of the discharge current IS.

The LED conducting state detection circuit 6 and the current source 5 are now described with reference to the LED driver circuit 1 shown in FIG. 3.

Figure 3:
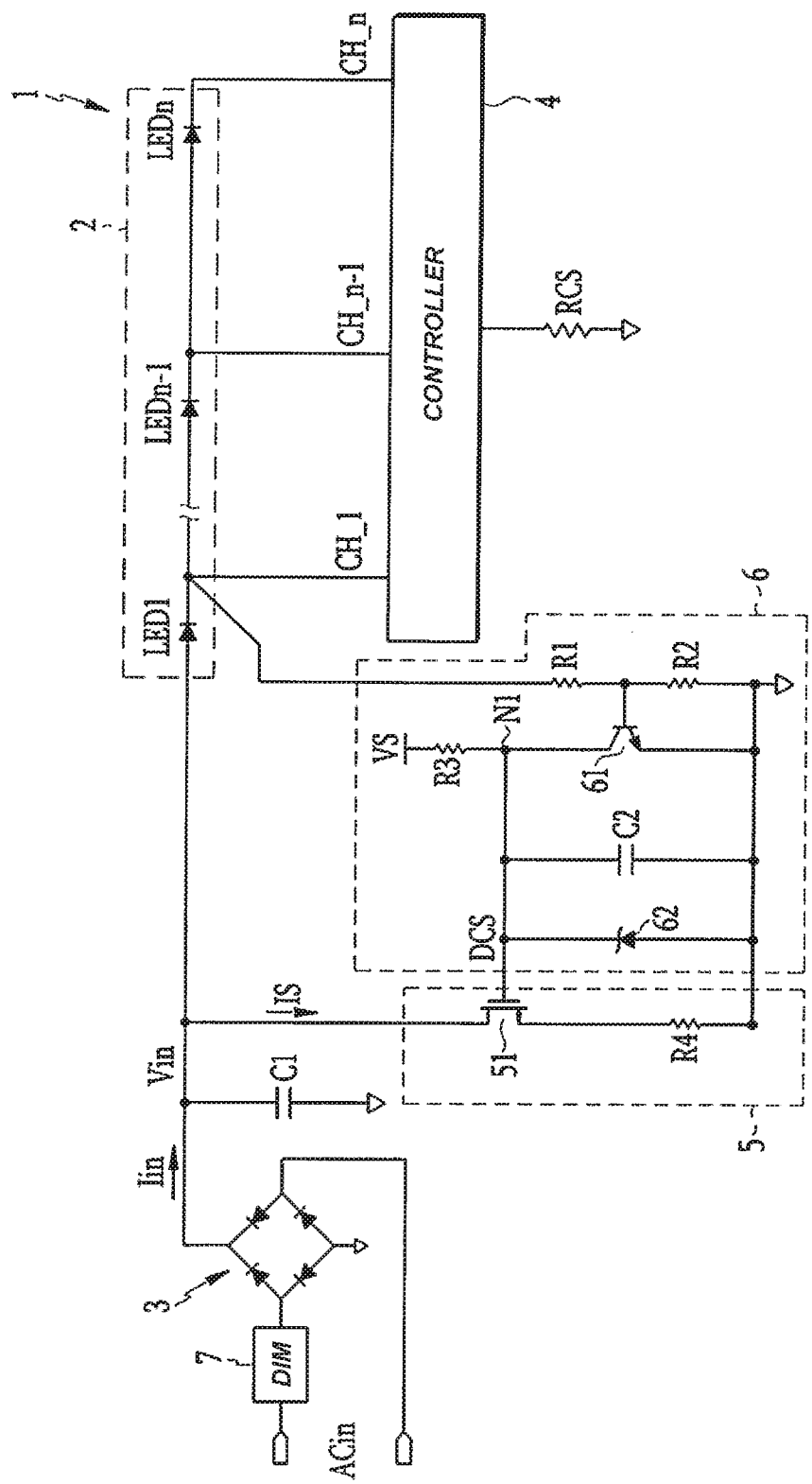
FIG. 3 shows further details of the LED conducting state detection circuit and the current source of FIG. 1, in accordance with an embodiment of the present invention.

FIG. 3 shows further details of the LED conducting state detection circuit 6 and the current source 5 in accordance with an embodiment of the present invention. Components illustrated in FIG. 3 that overlap with those illustrated in FIG. 1 are indicated with the same reference numerals and not redundantly described below. Although FIG. 3 depicts the LED conducting state detection circuit 6 using a cathode voltage of the LED element LED1 as an example, the present disclosure is not limited thereto. In the example of FIG. 3, the cathode voltage of the LED element LED1 is the input voltage Vin subtracted by a forward voltage of the LED element LED1, and thus varies according to the input voltage Vin.

In the example of FIG. 3, the LED conducting state detection circuit 6 includes three resistors R1-R3, a transistor 61, a capacitor C2, and a Zener diode 62. The transistor 61 may be implemented as an NPN bipolar junction transistor (BJT), although it may be implemented using other types of transistors.

The resistor R1 and the resistor R2 are connected in series between the cathode of the LED element LED1 and the ground, and resistive-divide the cathode voltage of the LED element LED1. The resistive-divided voltage is supplied to the base of the transistor 61.

A collector of the transistor 61 is connected to a node N1, and an emitter of the transistor 61 is connected to the ground. The resistor R3 is connected between the voltage source VS and the node N1. In the example of FIG. 3, the voltage source VS is the means for charging the capacitor C2. In other configurations, the current source 5 may be used to charge the capacitor C2.

The capacitor C2 and the Zener diode 62 are connected in parallel between the node N1 and the ground. The voltage on the capacitor C2 controls the voltage of the node N1 as the capacitor C2 is charged or discharged according to a switching operation of the transistor 61. The Zener diode 62 may clamp the voltage of the node N1 to the Zener voltage. The discharge control signal DCS follows the voltage of the node N1.

When the cathode voltage of the LED element LED1 is decreased according to a decrease in the input voltage Vin and reaches the discharge threshold voltage, the base voltage of the transistor 61 is decreased and thereby turns off the transistor 61. Accordingly, the capacitor C2 is charged with the current flowing from the voltage source VS through the resistor R3 such that the voltage of the node N1 is increased. The voltage of the node N1 may be increased to the Zener voltage. That is, the discharge control signal DCS may be increased starting from a time point when the transistor 61 is turned off according to the decrease in the input voltage Vin, and clamped to the Zener voltage of the Zener diode 62.

The transistor 61 turns on when the cathode voltage of the LED element LED1 is higher than the discharge threshold voltage. In that case, current flows to the ground through the transistor 61, and the capacitor C2 is not charged.

In the example of FIG. 3, the current source 5 includes a transistor 51 and a resistor R4. The transistor 51 may be implemented as an n-channel type MOSFET, although it may be implemented as other types of transistors.

The discharge control signal DCS is supplied to a gate of the transistor 51, and a drain of the transistor 51 is connected to the AC line (see also FIG. 1). A source of the transistor 51 is connected to one end of the resistor R4. The flow of the discharge current IS through the transistor 51 may be controlled according to the discharge control signal DCS.

Figure 4:
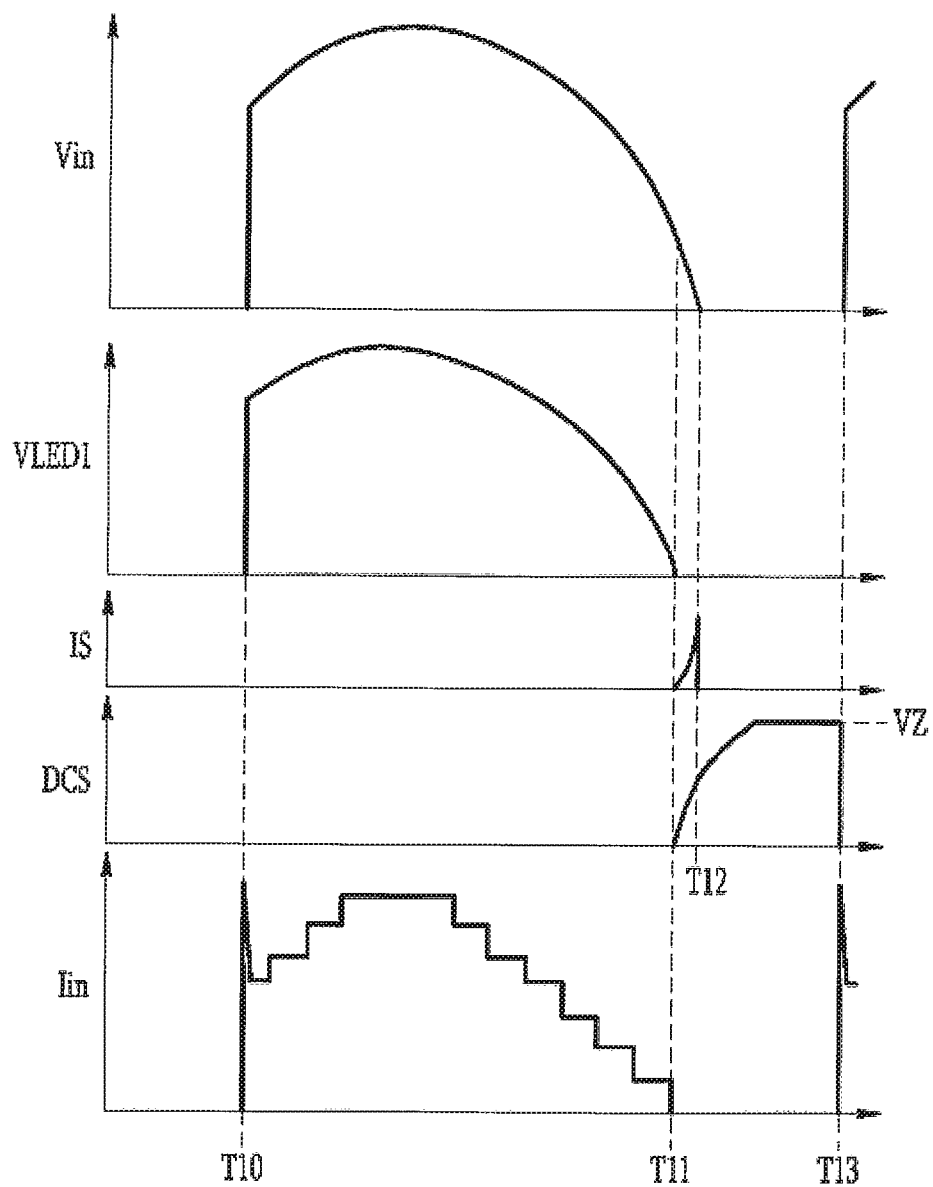
FIG. 4 shows waveforms of signals of the LED driver circuit of FIG. 3 in accordance with an embodiment of the present invention.

FIG. 4 shows waveforms of signals of the LED driver circuit 1 of FIG. 3 in accordance with an embodiment of the present invention. FIG. 4 shows, from top to bottom, the input voltage Vin, the cathode voltage VLED1 of the LED element LED1, the discharge current IS, the discharge control signal DCS, and the input current Iin.

The cathode voltage illustrated in FIG. 4 is the cathode voltage of the LED element LED1, which is indicated by VLED1. The input voltage Vin illustrated in FIG. 4 is an input voltage generated by a leading edge dimmer 7. The waveforms are illustrated in FIG. 4 only by way of example to describe the exemplary embodiments, and the present disclosure is not limited thereto.

In the example of FIG. 4, the dimmer 7 is turned on at time point T10 so that the input voltage Vin is generated and firing of the input current Iin is generated. A number of LED elements according to the level of the input voltage Vin conduct and the current ILED flows to the LED string 2. During the ON period of the dimmer 7, the input current Iin follows the current ILED and, accordingly, the input current Iin may also change according to the number of LED elements that conduct according to the level of the input voltage Vin.

When the input voltage Vin reaches its peak and then decreases due to the decrease in the input current Iin, the dimmer 7 turns off at time point T11. While it is illustrated by way of example that the cathode voltage VLED1 becomes zero voltage and the input current Iin does not flow at time point T11, this is only an example provided to explain the embodiments, and the present disclosure is not limited hereto.

The cathode voltage VLED1 is lower than the discharge threshold voltage at time point T11, and the LED conducting state detection circuit 6 generates the discharge control signal DCS. The current source 5 supplies the discharge current IS according to the discharge control signal DCS. The discharge current IS may be increased to the index waveform according to voltage-current characteristic of the transistor 51.

While FIG. 4 illustrates that the discharge current IS starts to flow without delay upon sensing LED non-conducting state, a delay may occur between time point T11 and the time point of generating the discharge current IS as noted above with reference to FIG. 2. Furthermore, the discharge current IS may flow with an offset level before time point T11.

Continuing with the example of FIG. 4, the capacitor C1 is discharged by the discharge current IS and the falling waveform of the input voltage Vin is controlled according to the waveform of the discharge current IS. When the input voltage Vin reaches zero voltage at time point T12, the discharge current IS may not flow anymore. The discharge control signal DCS may rise and be clamped to the Zener voltage VZ. The dimmer 7 is turned on again at time point T13 and the operation from time point T10 to time point T12 repeats.

Rather than regulating the input current Iin to a holding current, which is the method used in the related art in order to prevent the dimmer from turning off, the LED driver circuit 1 according to an exemplary embodiment controls the input voltage Vin by discharging the capacitor C1 after the dimmer 7 is turned off. By doing so, problems such as variations in the input voltage Vin, flicker, rising temperature of MOSFET, and so on can be alleviated.

Inrush current may be generated when the dimmer 7 is turned on. As illustrated in FIG. 4, the input current Iin has a firing due to influence of the inrush current. The LED driver circuit may further include a passive bleeder in order to prevent excessive rising of the input current Iin due to the inrush current. However, when the input voltage Vin starts to fall with a negative slope after the peak, negative current may flow to the passive bleeder, thus resulting in a problem of decreasing input current Iin.

Figure 5:
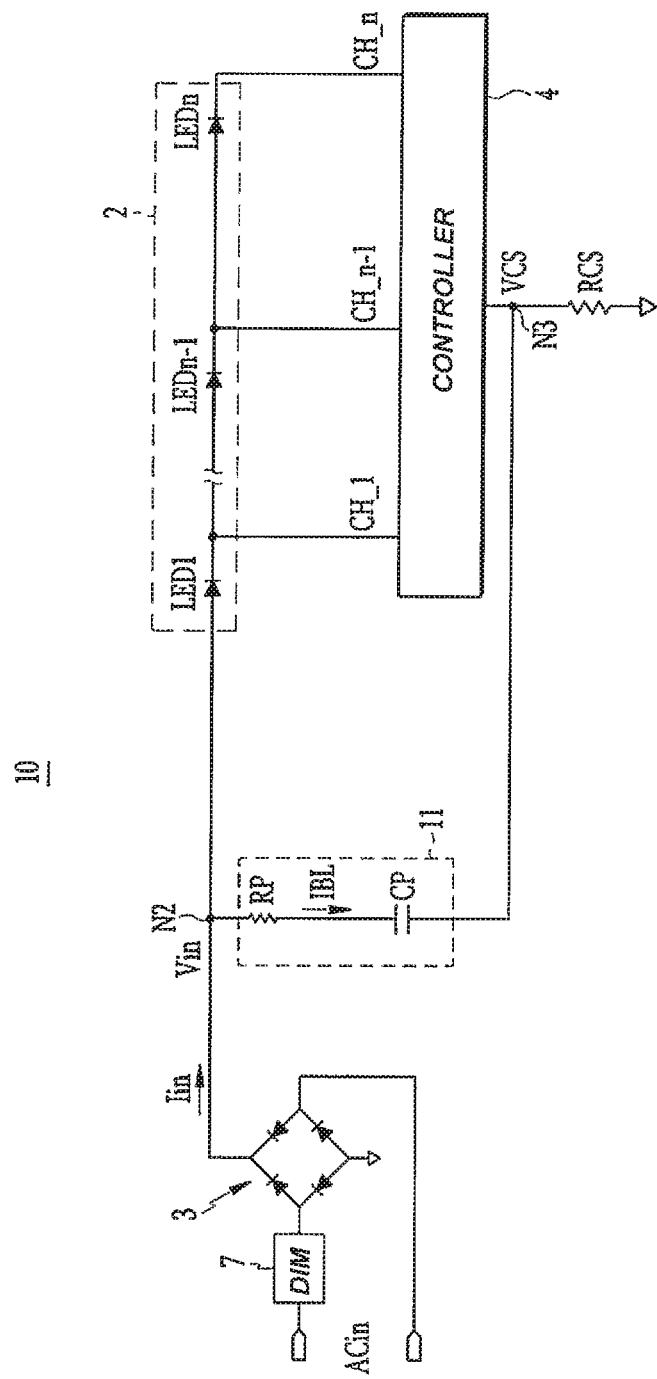
FIG. 5 shows a schematic diagram of an LED driver circuit in accordance with another embodiment of the present invention.

FIG. 5 shows a schematic diagram of an LED driver circuit 10 in accordance with an embodiment of the present invention.

In the example of FIG. 5, the LED driver circuit 10 includes a passive bleeder 11. The components of the LED driver circuit 10 illustrated in FIG. 5 that overlap with those illustrated in FIG. 1 are indicated with the same reference numerals and symbols.

In the example of FIG. 5, the passive bleeder 11 is connected between a node N2 to which the input voltage Vin is supplied and a node N3 where the sense voltage VCS is generated. The passive bleeder 11 includes a resistor RP and a capacitor CP.

The bleeder current IBL flows through the resistor RP and the capacitor CP to the node N3. When the input voltage Vin starts to decrease, the bleeder current IBL may have a negative value, and the phase of the bleeder current IBL may have 90 degree of difference from the phase of the input current Iin.

Figure 6:
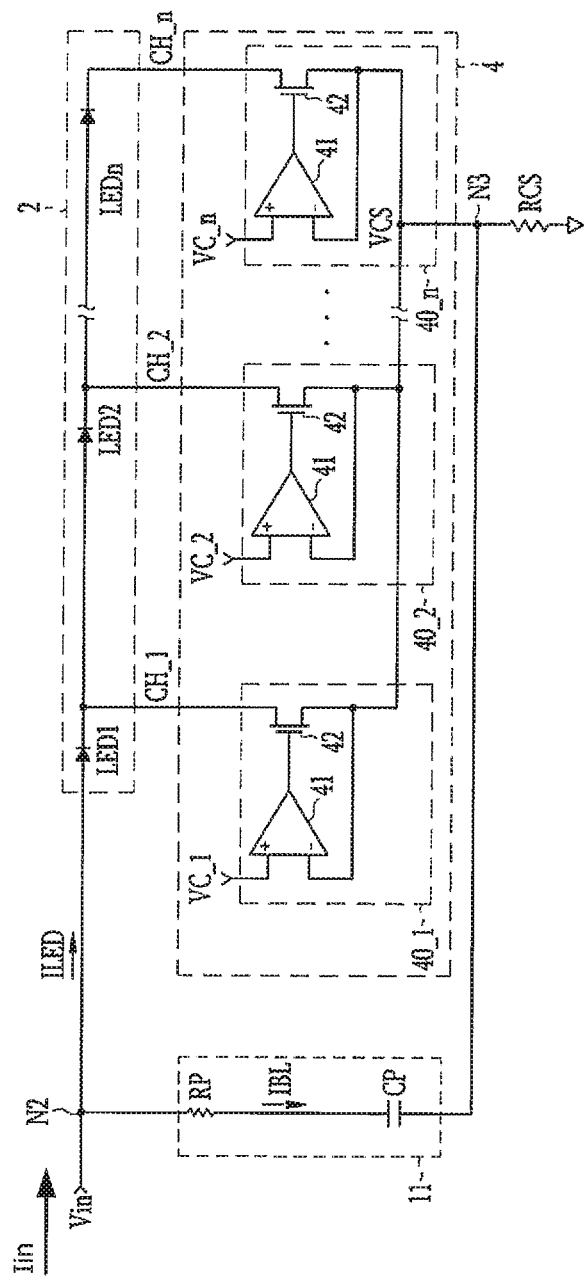
FIG. 6 shows further details of an LED current controller in accordance with an embodiment of the present invention.

FIG. 6 shows further details of an LED current controller 4 in accordance with an embodiment of the present invention. The LED driver circuit of FIG. 6 comprises the passive bleeder 11, the controller 4, and the LED string 2.

In the example of FIG. 6, the plurality of regulators 40_1-40_$n$ may comprise linear regulators. In the example of FIG. 6, the plurality of regulators 40_1-40_$n$ each includes a transistor 42 connected to a corresponding channel of the plurality of channels CH_1-CH_n, and an amplifier 41 ("regulator amplifier") for controlling the transistor 42. A drain of the transistor 42 is connected to the corresponding channel, and a source of the transistor 42 is connected to one end of the sense resistor RCS. An output of the amplifier 41 is connected to a gate of the transistor 42, an inverting terminal (−) of the amplifier 41 is connected to a source of the transistor 42, and a non-inverting terminal (+) of the amplifier 41 is inputted with a corresponding control voltage among the plurality of control voltages VC_1-VC_n.

The amplifier 41 generates an output based on a difference between a corresponding control voltage inputted to the non-inverting terminal (+) and the sense voltage VCS inputted to the inverting terminal (−), and the transistor 42 controls the current of the corresponding channel according to the output from the amplifier 41. Then the voltages of the non-inverting terminal (+) and the inverting terminal (−) of the amplifier 41 are regulated to be equal.

As can be appreciated, one way of detecting the LED non-conducting state is to monitor the output of the amplifier 41. When the output of the amplifier 41 is pulled up, it indicates that the input voltage Vin is lower than the forward voltage of the corresponding LED element and the LED current ILED does not flow. Another way of detecting the LED non-conducting state is to monitor the sense voltage VCS. When the sense voltage VCS is lower than a certain level, it indicates that the conduction of the LED string is almost finished. Accordingly, an LED conducting state detection circuit 6 may be configured to detect the LED non-conducting state by monitoring an end (cathode or anode) of an LED element, the output of the amplifier 41, and/or the sense voltage VCS.

Even when the bleeder current IBL is a negative value, the input current Iin may be compensated because the voltage of the node N3 is controlled to the sense voltage VCS by the enabled regulator among the plurality of regulators 40_1-40_n.

When the passive bleeder 11 is connected between the node N2 and the ground, the input current Iin decreases as much as a bleeder current IBL when the bleeder current IBL is a negative value. However, in another exemplary embodiment, even when the bleeder current IBL is a negative value, because the voltage of the node N3 is regulated to the sense voltage VCS, the current ILED flowing through a channel corresponding to the enabled regulator is increased as much as the bleeder current IBL.

Because the input current Iin is the sum of the bleeder current IBL and the current ILED, the current ILED may be increased as much as the bleeder current IBL is decreased. Accordingly, the input current Iin can be compensated.

Figure 7:
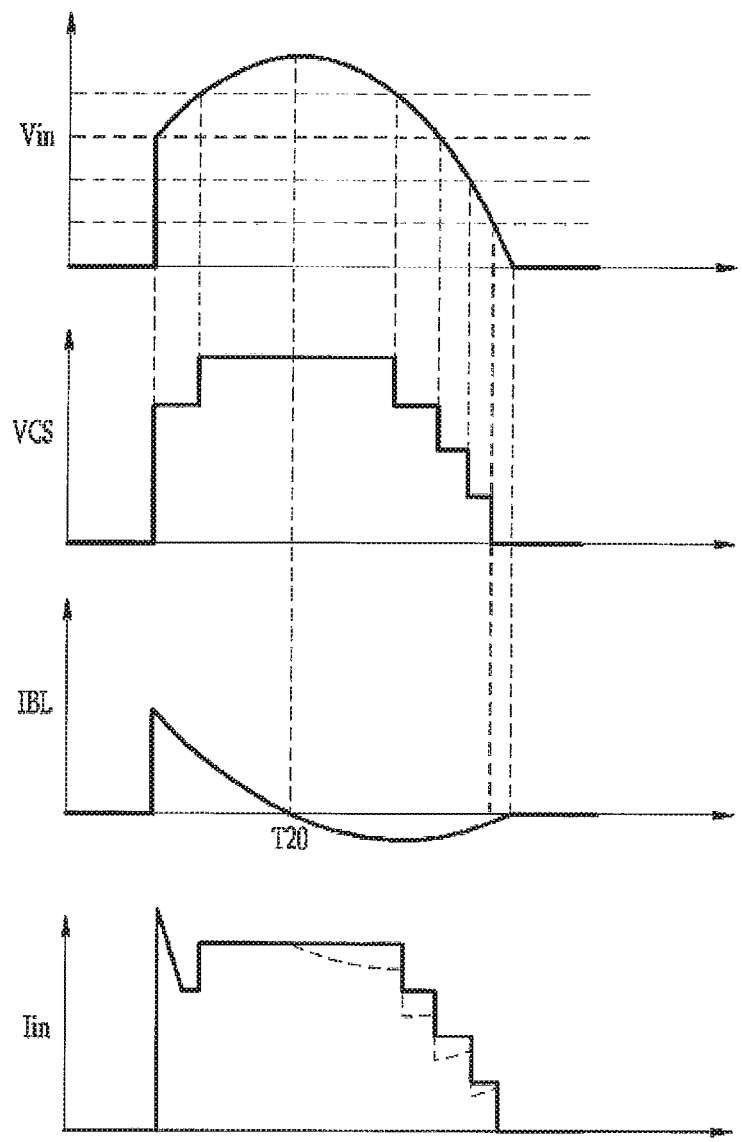
FIG. 7 shows waveforms of signals of the LED driver circuit of FIG. 6 in accordance with an embodiment of the present invention.

FIG. 7 shows waveforms of signals of the LED driver circuit of FIG. 6 in accordance with an embodiment of the present invention. FIG. 7 shows, from top to bottom, the input voltage Vin, the sense voltage VCS, the bleeder current IBL, and the input current Iin.

As illustrated in FIG. 7, the bleeder current IBL is generated as a negative value after time point T20 of a peak of the input current Vin. Advantageously, because the sense voltage VCS is regulated to the control voltage, the input current Iin is not decreased due to the bleeder current IBL. Without the bleeder current IBL being connected to the node N3, the input current Iin may decrease as indicated by the phantom line in the waveform of the input current Iin.

Figure 8:
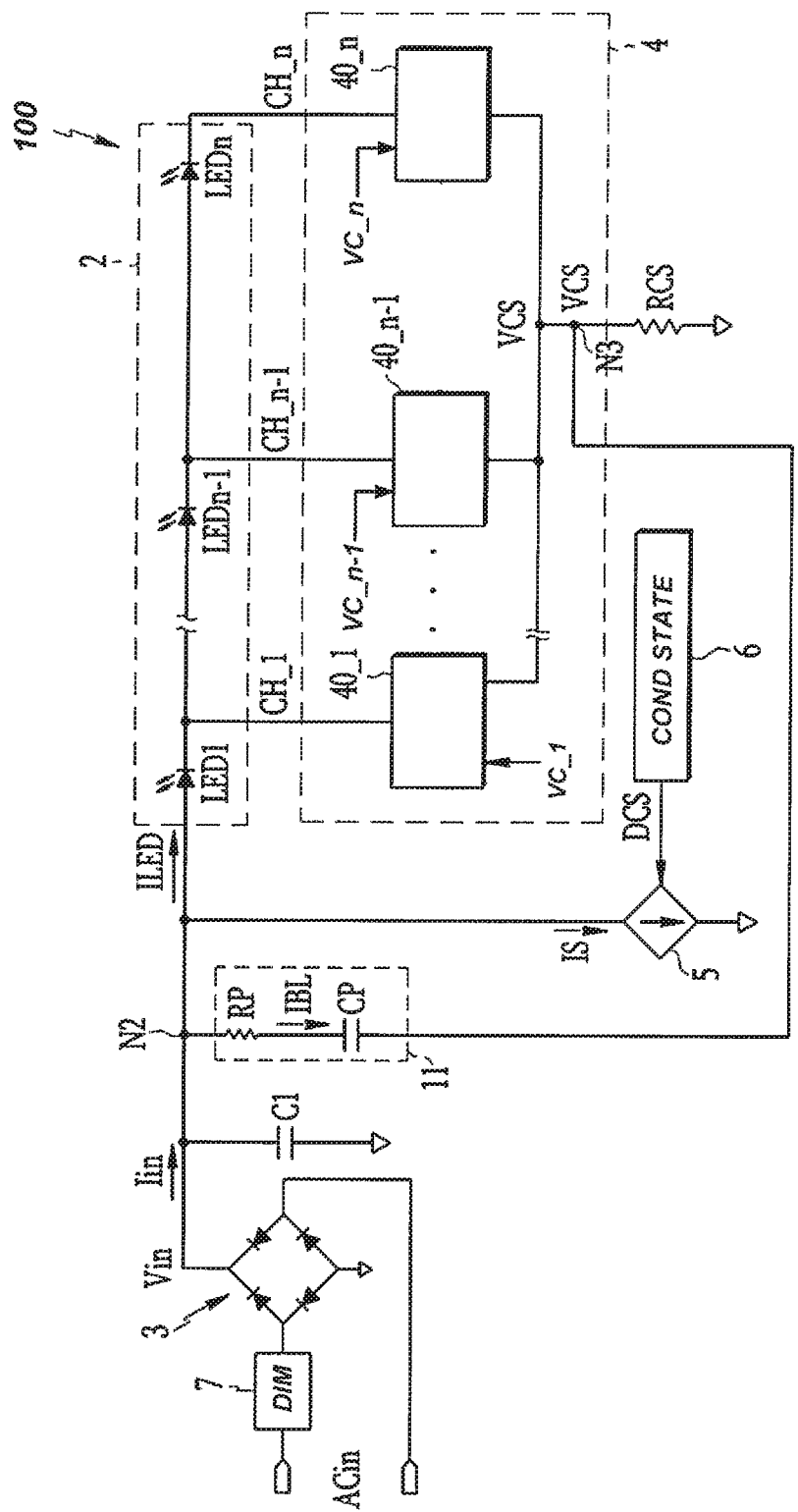
FIG. 8 shows a schematic diagram of an LED driver circuit in accordance with another embodiment of the present invention.

The embodiment illustrated in FIGS. 1 and 3 may be combined with the embodiment illustrated in FIG. 5 as shown in FIG. 8.

FIG. 8 shows a schematic diagram of an LED driver circuit 100 in accordance with an embodiment of the present invention. As illustrated in FIG. 8, the LED driver circuit 100 may include the current source 5, the LED conducting state detection circuit 6, and the passive bleeder 11. The configuration and operation of the LED driver circuit 100 are as previously described.

Figure 9:
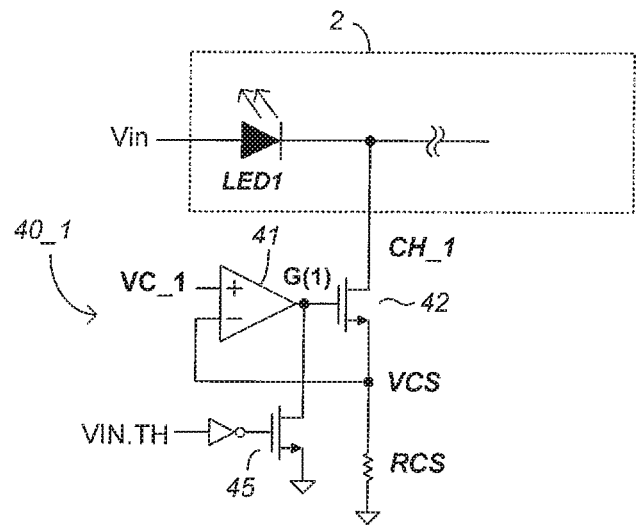
FIG. 9 shows a schematic diagram of a regulator of an LED current controller in accordance with an embodiment of the present invention.

FIG. 9 shows a schematic diagram of a regulator of an LED current controller in accordance with an embodiment of the present invention. The regulator of FIG. 9 may be employed as a regulator in an LED current controller 4. In the example of FIG. 9, the regulator is illustrated as a regulator 40_1 of the controller 4. It is to be noted that the regulator of FIG. 9 may be employed in other LED current controllers.

A regulator 40_1 may include the regulator amplifier 41 and the transistor 42 as previously explained with reference to FIG. 6. The drain of the transistor 42 is connected to a cathode of the LED element LED1 of the LED string 2. The inverting (−) input of the amplifier 41 and the source of the transistor 42 are connected to the sense voltage VCS that is developed on the sense resistor RCS. The operation of these components are as previously explained.

In the example of FIG. 9, the regulator 40_1 further includes a spike current suppression circuit comprising a transistor 45. The gate of the transistor 45 is driven by an input threshold voltage VIN.TH through an inverter.

Figure 10:
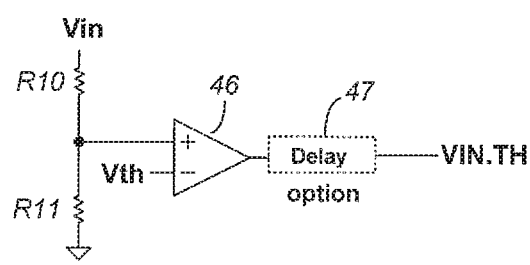
FIG. 10 shows a schematic diagram of an input threshold voltage generator in accordance with an embodiment of the present invention.

FIG. 10 shows a schematic diagram of an input threshold voltage generator in accordance with an embodiment of the present invention. In the example of FIG. 10, a resistive divider comprising resistors R10 and R11 scales the input voltage Vin to generate a voltage that is indicative of the input voltage Vin, which is input to an amplifier 46. The amplifier 46 compares the scaled input voltage Vin to a threshold voltage Vth to generate the input threshold voltage VIN.TH. The input threshold voltage VIN.TH is high when the scaled input voltage Vin is greater than the threshold voltage Vth, and the input threshold voltage VIN.TH is low when the scaled input voltage Vin is lower than the threshold voltage Vth. An optional delay 47 may be added to the output of the amplifier 46.

Referring back to FIG. 9, when the input threshold voltage VIN.TH is low, the transistor 45 is on and pulls down the output G(1) of the amplifier 41. Because the output G(1) is pulled down, LED spike current that may occur when the input voltage VIN increases back up is suppressed.

Figure 11:
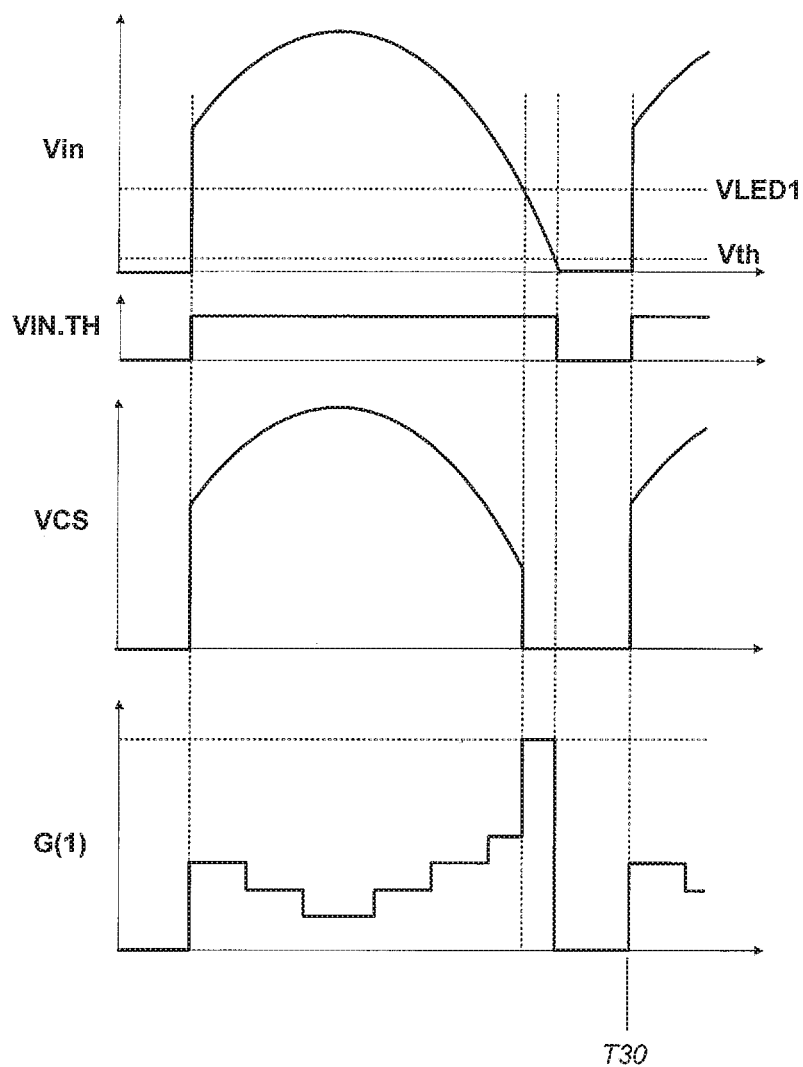
FIG. 11 shows waveforms of signals of an LED driver circuit with the regulator of FIG. 9, in accordance with an embodiment of the present invention.

FIG. 11 shows waveforms of signals of an LED driver circuit with the regulator of FIG. 9, in accordance with an embodiment of the present invention. FIG. 11 shows, from top to bottom, the input voltage Vin, the input threshold voltage VIN.TH, the sense voltage VCS, and the output G(1) of the amplifier 41. Also shown in FIG. 11 are the cathode voltage VLED1 of the LED element LED1 and a threshold voltage Vth. As can be appreciated, the input voltage Vin and/or the threshold voltage Vth may be scaled depending on implementation details.

As shown in FIG. 11, the input threshold voltage VIN.TH is high when the input voltage Vin is higher than the threshold voltage Vth, and is low when the input voltage Vin is lower than the threshold voltage Vth. The output G(1) decreases as the sense voltage VCS increases, and increases as the sense voltage VCS decreases. The sense voltage VCS drops to zero when the input voltage Vin decreases below the cathode voltage VLED1 of the LED element LED1, entering the LED non-conducting state. A zoom-in view at time T30 is shown in FIG. 12.

Figure 12:
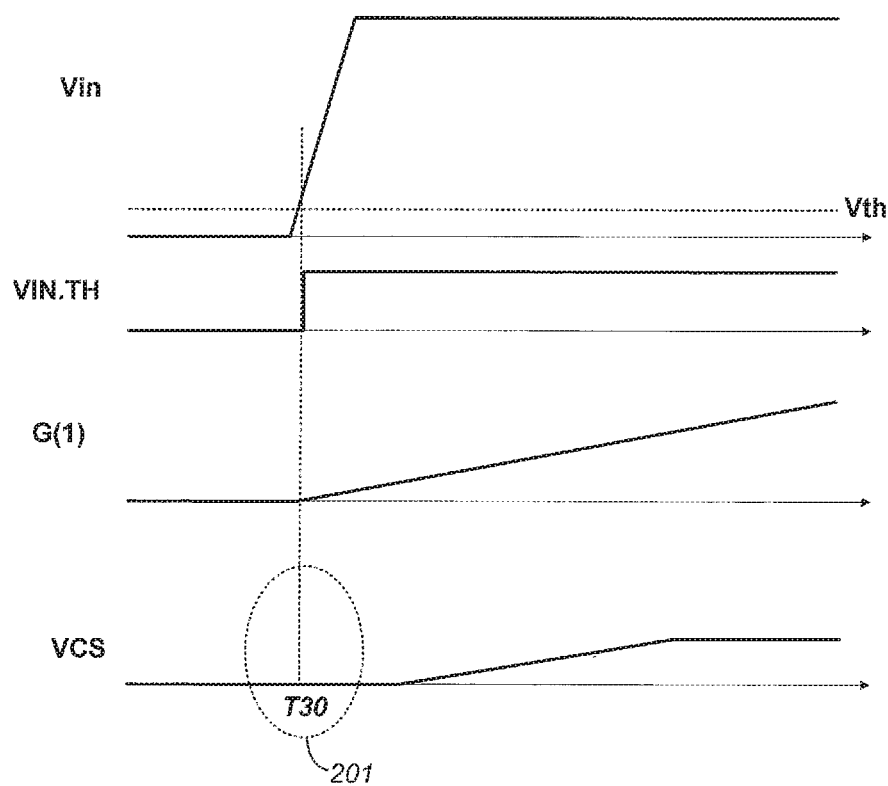
FIG. 12 shows a zoom-in view of waveforms of signals in the example of FIG. 11 in accordance with an embodiment of the present invention.

FIG. 12 shows a zoom-in view of waveforms of signals in the example of FIG. 11 at time T30. FIG. 12 shows, from top to bottom, the input voltage Vin, the input threshold voltage VIN.TH, the output G(1) of the amplifier 41, and the sense voltage VCS. FIG. 12 shows the input voltage Vin as rectangular for ease of illustration.

As shown in FIG. 12, the input threshold voltage VIN.TH is high when the input voltage Vin increases above the threshold voltage Vth at time T30. This turns off the transistor 45, thereby removing the pull down and allowing the output G(1) to increase and turn on the transistor 42. Turning on the transistor 42 allows current to flow through the channel CH_1 and to the sense resistor RCS, thereby causing the sense voltage VCS to increase. Because of the pull down on the output G(1) when the input voltage Vin is below the threshold voltage Vth, a spike current that may occur at the time T30 (see dotted area 201) is suppressed.

Figure 13:
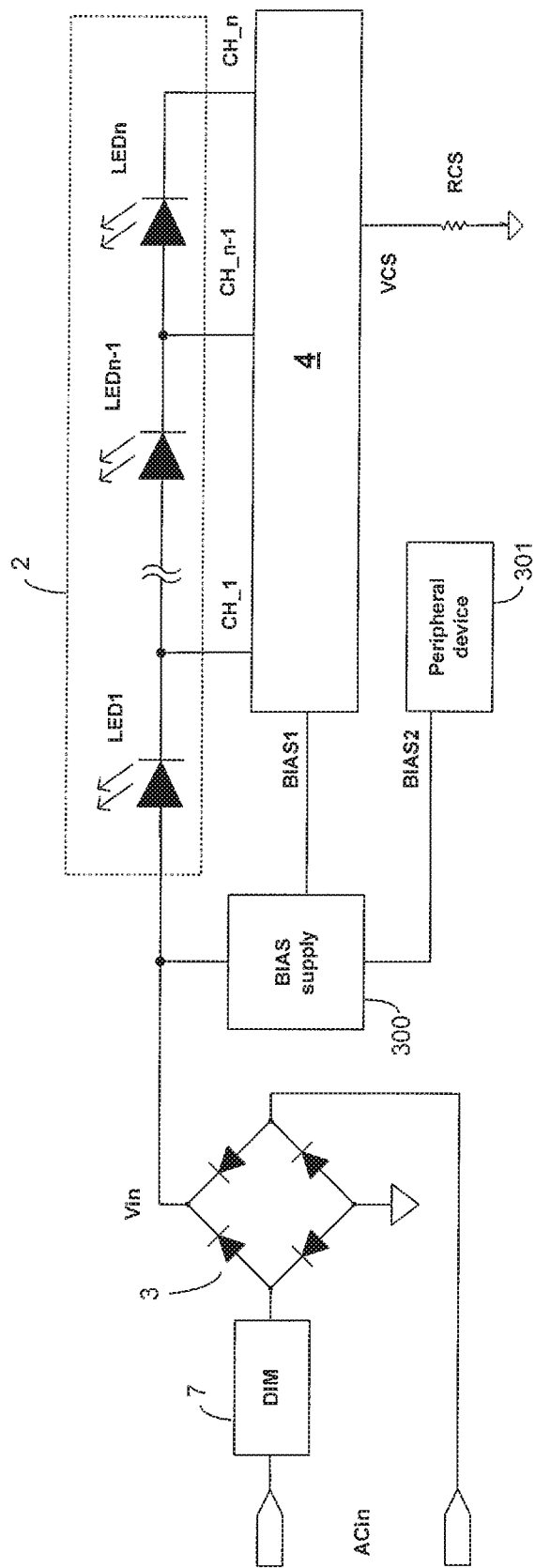
FIG. 13 shows a schematic diagram of an LED driver circuit in accordance with another embodiment of the present invention.

FIG. 13 shows a schematic diagram of an LED driver circuit in accordance with an embodiment of the present invention. The LED driver circuit of FIG. 13 includes the previously described LED string 2, rectifier circuit 3, LED current controller 4, dimmer 7, and sense resistor RCS.

In the example of FIG. 13, the LED driver circuit further includes a bias supply circuit 300 for providing a bias voltage BIAS1 to the controller 4 and, optionally, a bias voltage BIAS2 to a peripheral device 301. The bias supply circuit 300 may be a low dropout regulator (LDO) or simply a resistor that is connected to the input voltage Vin. However, that implementation would lead to large power losses as the input voltage Vin becomes higher.

Figure 14:
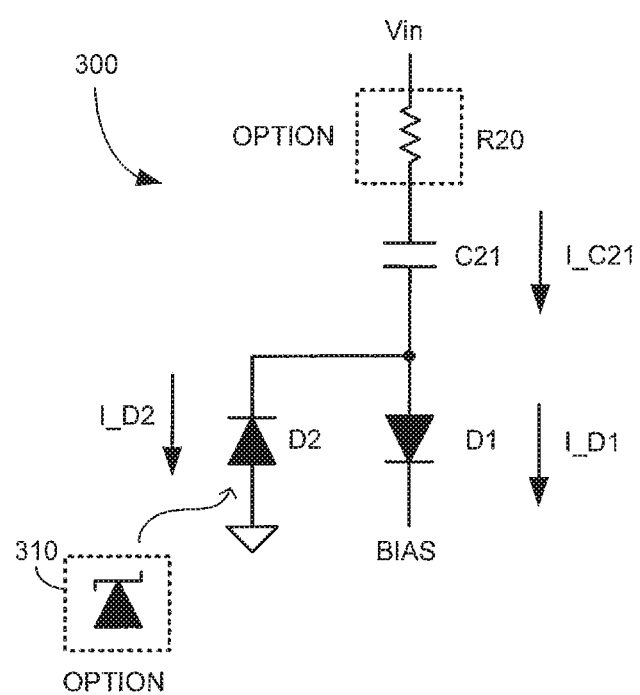
FIG. 14 shows a schematic diagram of a bias supply circuit in accordance with an embodiment of the present invention.

FIG. 14 shows a schematic diagram of a bias supply circuit 300 in accordance with an embodiment of the present invention. In the example of FIG. 14, the bias supply circuit 300 includes a capacitor C21, a diode D1, and a diode D2. One end of the capacitor C21 is connected to the input voltage Vin, and the other end of the capacitor C21 is connected to an anode of the diode D1 and to a cathode of the diode D2. The bias supply circuit 300 may optionally include a resistor R20 that is in series with the capacitor C21 to form a passive bleeder. The diode D2 may optionally be a Zener diode (see 310) to limit the bias voltage if the bias voltage is too high due to excessive energy from the capacitor C21. The phase-cut dimmer 7 (shown in FIG. 13) is optional and can be added to modulate the input voltage Vin.

In the example of FIG. 14, the anode of the diode D2 is connected to ground, and the cathode of the diode D2 is connected to the anode of the diode D1 and to the other end of the capacitor C21. The anode of the diode D1 is connected to the cathode of the diode D2 and to the other end of the capacitor C21. The cathode of the diode D1 provides the bias voltage BIAS to the controller 4, peripheral device 301, and/or other circuits.

Figure 15:
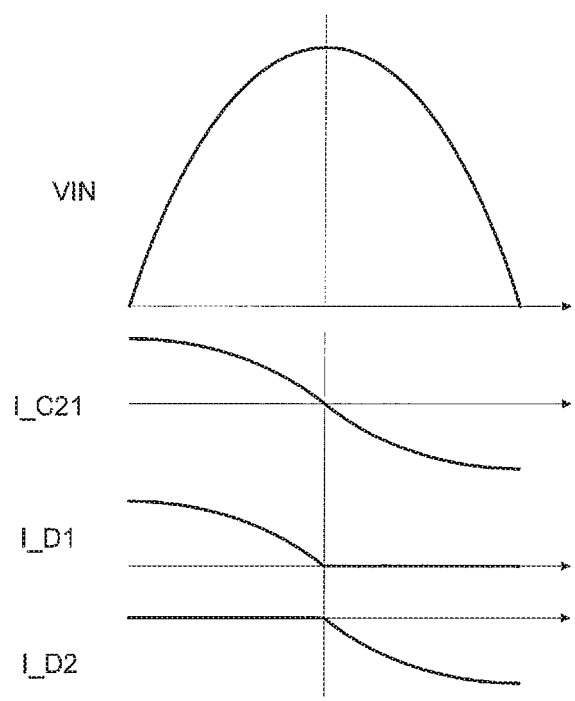
FIG. 15 shows waveforms of signals of the bias supply circuit of FIG. 14 in accordance with an embodiment of the present invention.

In the example of FIG. 14 a capacitor current I_C21 flows to the capacitor C21 from the input voltage Vin, a first diode current I_D1 flows from the anode to the cathode of the diode D1, and a second diode current I_D2 flows from the cathode to the anode of the diode D2. FIG. 15 shows the waveforms and timing relationships of these signals in one embodiment. FIG. 15 shows, from top to bottom, the input voltage Vin, the capacitor current I_C21, the first diode current I_D1, and the second diode current I_D2.

LED driver circuits and methods of operating same have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A light emitting diode (LED) driver circuit, comprising:
a dimmer connected to an AC input;
a rectifier circuit that is configured to receive the AC input from the dimmer, and to rectify the AC input to generate an input voltage;
an LED string having a first end defined by an anode of an LED element in a first position in the LED string, and the LED string having a second end defined by a cathode of an LED element in a last position of the LED string, the anode of the LED element in the first position connected to the input voltage;
an LED conducting state detection circuit configured to detect a conducting state of the LED string, and to generate a discharge control signal in response to sensing the LED string in a non-conducting state wherein an LED current does not flow to the LED string; and
a current source coupled between the rectifier circuit and the anode of the LED element in the first position in the LED string, the current source configured to generate a discharge current according to the discharge control signal when the LED string is in the non-conducting state.

2. The LED driver circuit of claim 1, wherein the current source generates the discharge current having a level according to the discharge control signal after a delay period from a time point of sensing the non-conducting state of the LED string.

3. The LED driver circuit of claim 1, wherein the LED conducting state detection circuit is configured to detect the conducting state of the LED string from a first end of the at least one LED element.

4. The LED driver circuit of claim 3, wherein the first end of the at least one LED element is a cathode of the at least one LED element.

5. The LED driver circuit of claim 3, wherein the first end of the at least one LED element is an anode of the at least one LED element.

6. The LED driver circuit of claim 1, wherein the LED conducting state detection circuit is configured to detect the conducting state of the LED string from a sense voltage developed on a sense resistor by the LED current.

7. The LED driver circuit of claim 1, wherein the LED conducting state detection circuit is configured to detect the conducting state of the LED string from an output of an amplifier that is configured to regulate the LED current.

8. A light emitting diode (LED) driver circuit, comprising:
a dimmer connected to an AC input;
a rectifier circuit that is configured to receive the AC input from the dimmer, and to rectify the AC input to generate an input voltage;
an LED string having a first end that is connected to the input voltage, the LED string comprising at least one LED element;
an LED conducting state detection circuit configured to detect a conducting state of the LED string, and to generate a discharge control signal in response to sensing the LED string in a non-conducting state wherein an LED current does not flow to the LED string; and
a current source that is connected to the first end of the LED string, the current source being configured to generate a discharge current according to the discharge control signal when the LED string is in the non-conducting state;
wherein the LED conducting state detection circuit comprises:
a first transistor connected between a first node and a ground and operates according to a voltage at a first end of the at least one LED element; and
a charging circuit connected to the first node,
wherein the discharge control signal follows a voltage of the first node.

9. A light emitting diode (LED) driver circuit, comprising:
an LED conducting state detection circuit configured to detect a conducting state of an LED string, and to generate a discharge control signal in response to sensing that the LED string is in a non-conducting state wherein an LED current does not flow to the LED string; and a current source coupled between a first end of the LED string and an input voltage, the current source configured to control a discharge current that flows to the current source according to the discharge control signal when the LED string is detected to be in the non-conducting state.

10. The LED driver circuit of claim 9, further comprising:
a plurality of channel controllers that each controls a corresponding channel of a plurality of channels of the LED string; and
a sense resistor that is configured to receive current flowing through each of the plurality of channels.

11. The LED driver circuit of claim 10, wherein the LED conducting state detection circuit is configured to detect that the LED string is in the non-conducting state from an output of a regulator amplifier of a channel of the plurality of channels.

12. The LED driver circuit of claim 10, wherein the LED conducting state detection circuit is configured to generate the discharge control signal in accordance with a sense voltage on the sense resistor.

13. The LED driver circuit of claim 10, wherein the LED conducting state detection circuit is configured to detect that the LED string is in the non-conducting state from a sense voltage on the sense resistor.

14. The LED driver circuit of claim 10, wherein the discharge current is from a capacitor that is charged by a source voltage of the LED conducting state detection circuit.

15. The LED driver circuit of claim 9, wherein the LED conducting state detection circuit is configured to detect that the LED string is in the non-conducting state from an end of an LED of the LED string.

16. The LED driver circuit of claim 9, further comprising:
a dimmer; and
a rectifier that is configured to generate the input voltage by rectifying an output of the dimmer.

* * * * *